United States Patent [19]

Hamamoto et al.

[11] Patent Number: 4,943,102
[45] Date of Patent: Jul. 24, 1990

[54] WINDSHIELD SUPPORTING STRUCTURE FOR A VEHICLE

[75] Inventors: Masaya Hamamoto; Keiichiro Shibata, both of Hiroshima, Japan

[73] Assignee: Mazda Motor Corporation, Hiroshima, Japan

[21] Appl. No.: 342,853

[22] Filed: Apr. 25, 1989

[30] Foreign Application Priority Data

Apr. 29, 1988 [JP] Japan .................................. 63-106756

[51] Int. Cl.⁵ ............................................. B62D 25/10
[52] U.S. Cl. .................................. 296/96.21; 296/192
[58] Field of Search ....................... 296/84.1, 192, 194, 296/96.21, 96.22, 96.16, 96.17

[56] References Cited

FOREIGN PATENT DOCUMENTS 104470 6/1982 Japan .................................. 296/192
14577 1/1984 Japan .................................. 296/192

Primary Examiner—Robert R. Song
Attorney, Agent, or Firm—Sixbey, Friedman, Leedom & Ferguson

[57] ABSTRACT

A windshield supporting structure which is to be employed in combination with an open cowl structure having an opening which opens upward includes a windshield supporting portion which is provided at the rear end portion of the opening. The windshield is bonded to the windshield supporting portion. The windshield supporting portion is positioned so that it supports the windshield at an intermediate portion thereof as viewed in the longitudinal direction of the vehicle body and so that the windshield extends forward and downward beyond the windshield supporting portion.

19 Claims, 10 Drawing Sheets

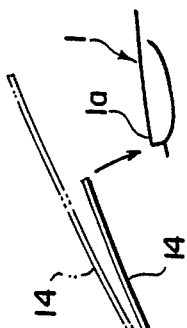
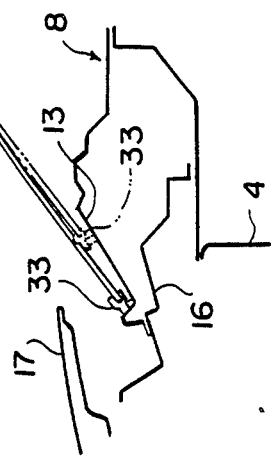
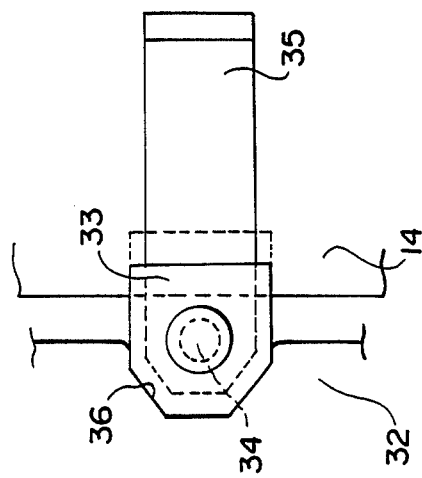

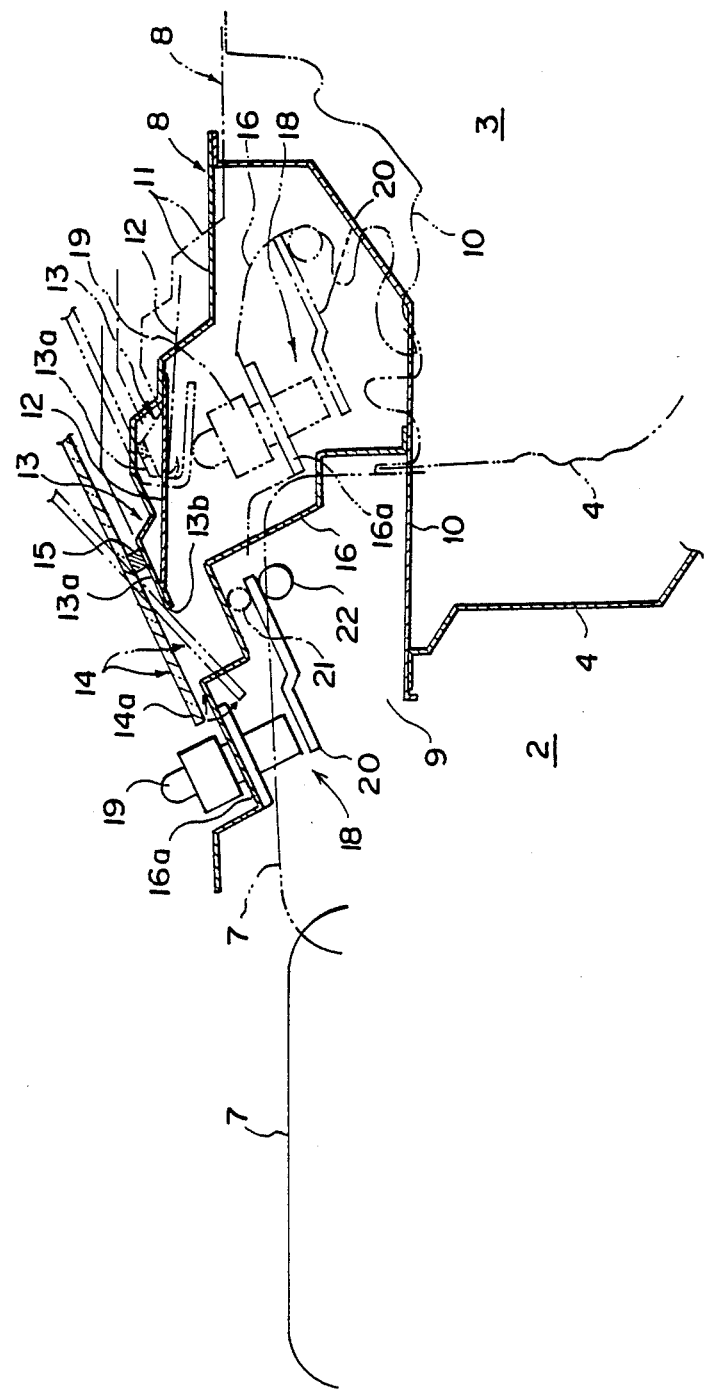

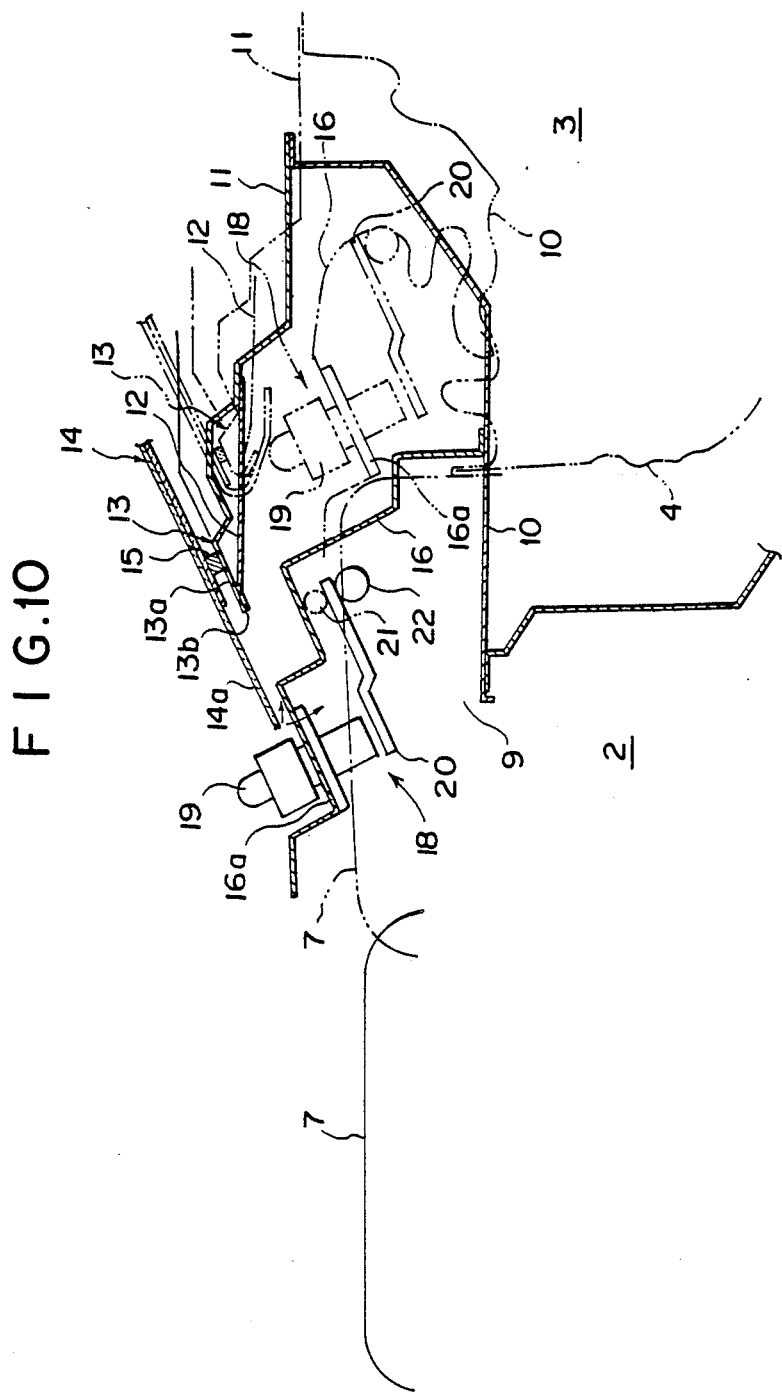

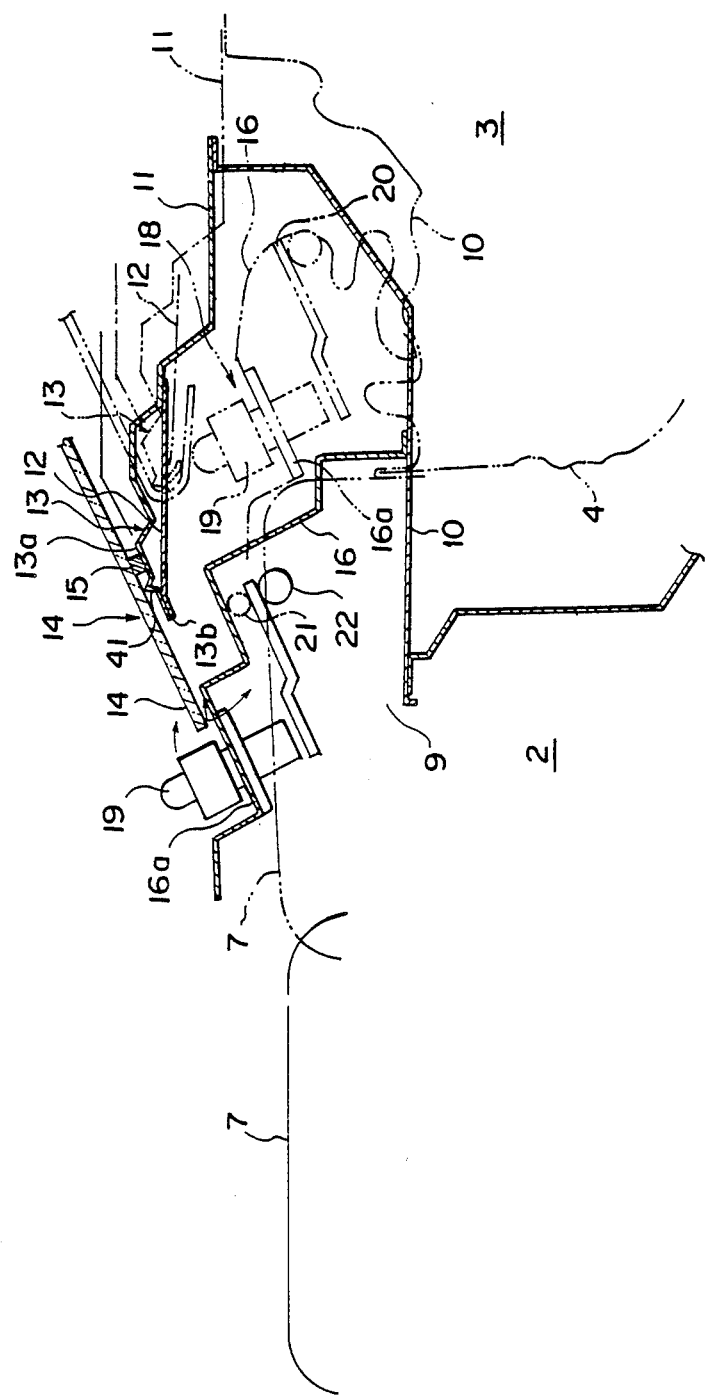

WINDSHIELD SUPPORTING STRUCTURE FOR A VEHICLE

BACKGROUND OF THE INVENTION

1. Field of the Invention

This invention relates to a windshield supporting structure for a vehicle.

2. Description of the Prior Art

As disclosed, for instance, in Japanese Unexamined Utility Model Publication No. 62(1987)-117156, there has been known a structure for supporting a windshield of a vehicle in which a windshield supporting portion is provided at the rear end portion of an open cowl structure and the lower end portion of the windshield is bonded to the windshield supporting portion. In such a structure, the cowl portion is inherently of an open cross-section and accordingly, the structure is advantageous in that less rearward load acts on the windshield upon head-on collision and the possibility of breakage of the windshield or debonding of the windshield from the windshield supporting portion is smaller.

In the windshield supporting structure combined with the open cowl structure, there has been a demand in view of aerodynamic performance, design and the like that the lower end portion of the windshield should extend forward and downward as far as possible and the cowl point (the intersection of the engine hood line and the windshield) should be positioned as far forward and as low as possible in order to lower the height of the engine hood.

However, when the lower end portion of the windshield is extended forward and downward, the windshield is apt to be subjected to a load upon head-on collision. That is, it is generally considered that the rigid parts in the engine room, e.g., the engine body, a surge tank and the like, are displaced rearward upon a head-on collision and deform the cowl portion (the cowl front panel) in the rearward direction, whereby the cowl portion impacts against the lower end portion of the windshield and the windshield is debonded from the windshield supporting portion. These considerations have been limiting the forward and downward extension of the windshield, and accordingly, the demand for a lower engine hood has not been satisfied.

Further, when the windshield is extended forward and downward in a vehicle provided with an open cowl structure, the concealment of the wiper system is facilitated and also from this viewpoint, it is preferred that the windshield be extended forward and downward as far as possible. However, if the windshield is extended forward and downward and the wiper system is positioned in front of the extended lower end portion of the windshield and below the engine hood, the wiper system will impact against the lower end portion of the windshield upon head-on collision and debond the windshield from the windshield supporting portion.

SUMMARY OF THE INVENTION

In view of the foregoing observations and description, the primary object of the present invention is to provide a windshield supporting structure which is employed in combination with an open cowl structure and which permits the forward and downward extension of the windshield without increasing the possibility of debonding of the windshield from the windshield supporting portion upon head-on collision, thereby permitting a reduction in the height of the engine hood and facilitating realization of a concealed wiper.

In accordance with the present invention, there is provided a windshield supporting structure which is to be employed in combination with an open cowl structure having an opening which opens upward, and comprises a windshield supporting portion which is provided at the rear end portion of the opening and to which the windshield is bonded, characterized in that said windshield supporting portion is positioned so that it supports the windshield at an intermediate portion thereof as viewed in the longitudinal direction of the vehicle body and so that the windshield extends forward and downward beyond the windshield supporting portion.

With the windshield supporting structure in accordance with the present invention, when, for instance, the wiper system is displaced rearward and impacts against the portion of the windshield positioned forward and downward of the windshield supporting portion (will be referred to as "the forward extension portion") upon head-on collision, a bending moment acts on the forward extension portion of the windshield and a large force locally acts on the windshield at the portion opposed to the windshield supporting portion, whereby the forward extension portion of the windshield is bent rearward about the windshield supporting portion. After the forward extension portion of the windshield is bent, the rearward load due to the head-on collision does not act on the windshield any longer, and accordingly, debonding of the windshield from the windshield supporting portion can be avoided. Thus, in accordance with the present invention, the windshield can be extended forward and downward without an increase in the possibility of debonding of the windshield from the windshield supporting portion upon head-on collision.

In accordance with one preferred embodiment of the present invention, a deformation control means which makes the forward extension portion of the windshield more bendable than the other part of the windshield is provided. For example, the deformation control means may be a notch formed on the windshield on the forward extension portion side of the windshield supporting portion or may be a projection formed on the windshield supporting portion so that it opposes the forward extension portion of the windshield. Further, the deformation control means may comprise a combination of such a notch and a projection.

BRIEF DESCRIPTION OF THE DRAWINGS

FIG. 5 is a side view for illustrating how to mount the windshield, FIG. 7 is a view showing a modification of the locator member, FIG. 8 is a view for illustrating the behavior of the parts of the front part shown in FIG. 1 upon head-on collision, FIG. 10 is a view similar to FIG. 8 but showing the behavior, upon head on collision, of the parts of a front part of a vehicle body provided with a windshield supporting structure in accordance with still another embodiment of the present invention, and FIG. 11 is a view similar to FIG. 8 but showing the behavior, upon head-on collision, of the parts of a front part of a vehicle body provided with a windshield supporting structure in accordance with still another embodiment of the present invention.

DESCRIPTION OF THE PREFERRED EMBODIMENTS

Figure 1:
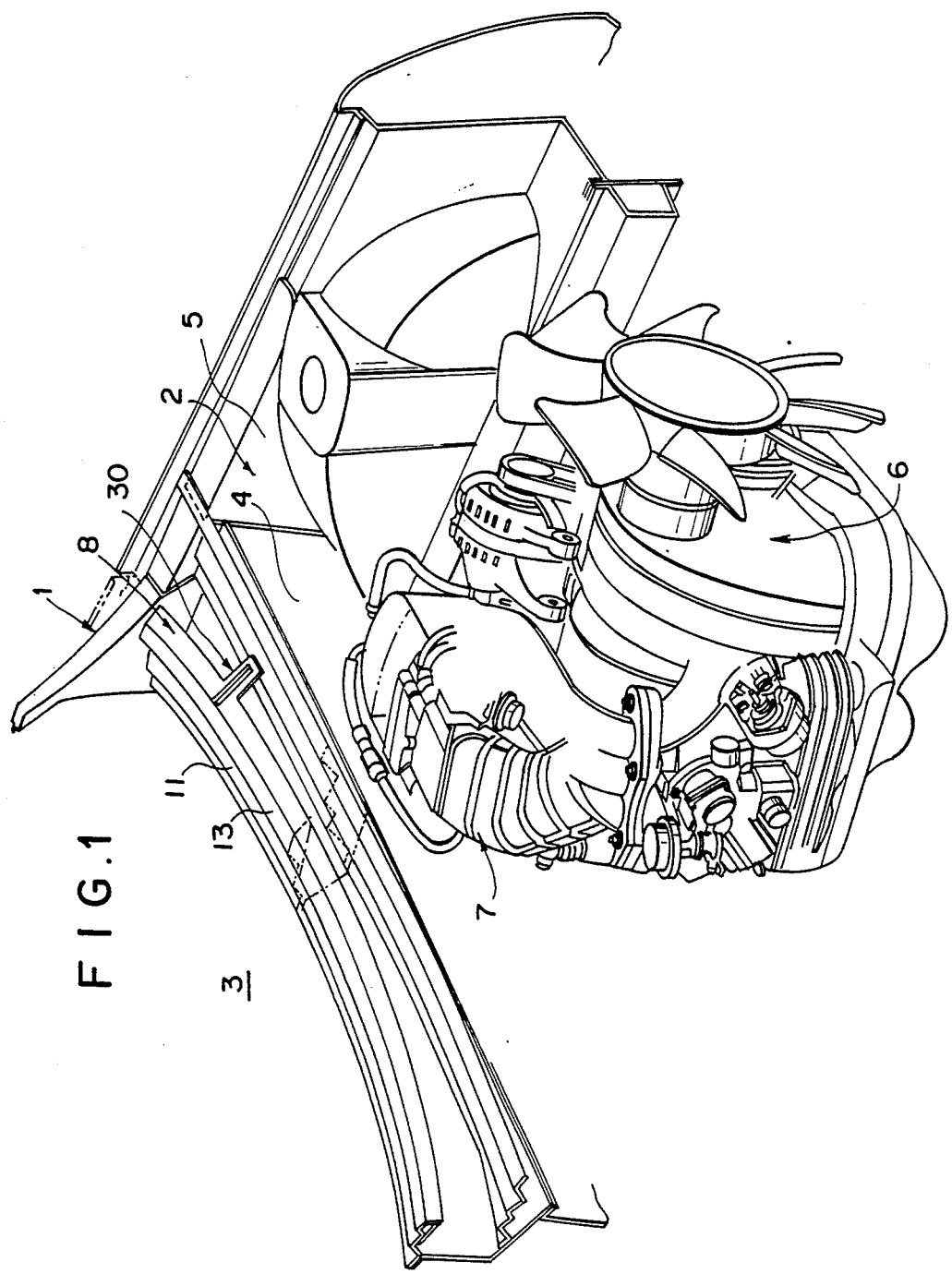
FIG. 1 is a perspective showing a front part of a vehicle body provided with a windshield supporting structure in accordance with an embodiment of the present invention.
Figure 2:
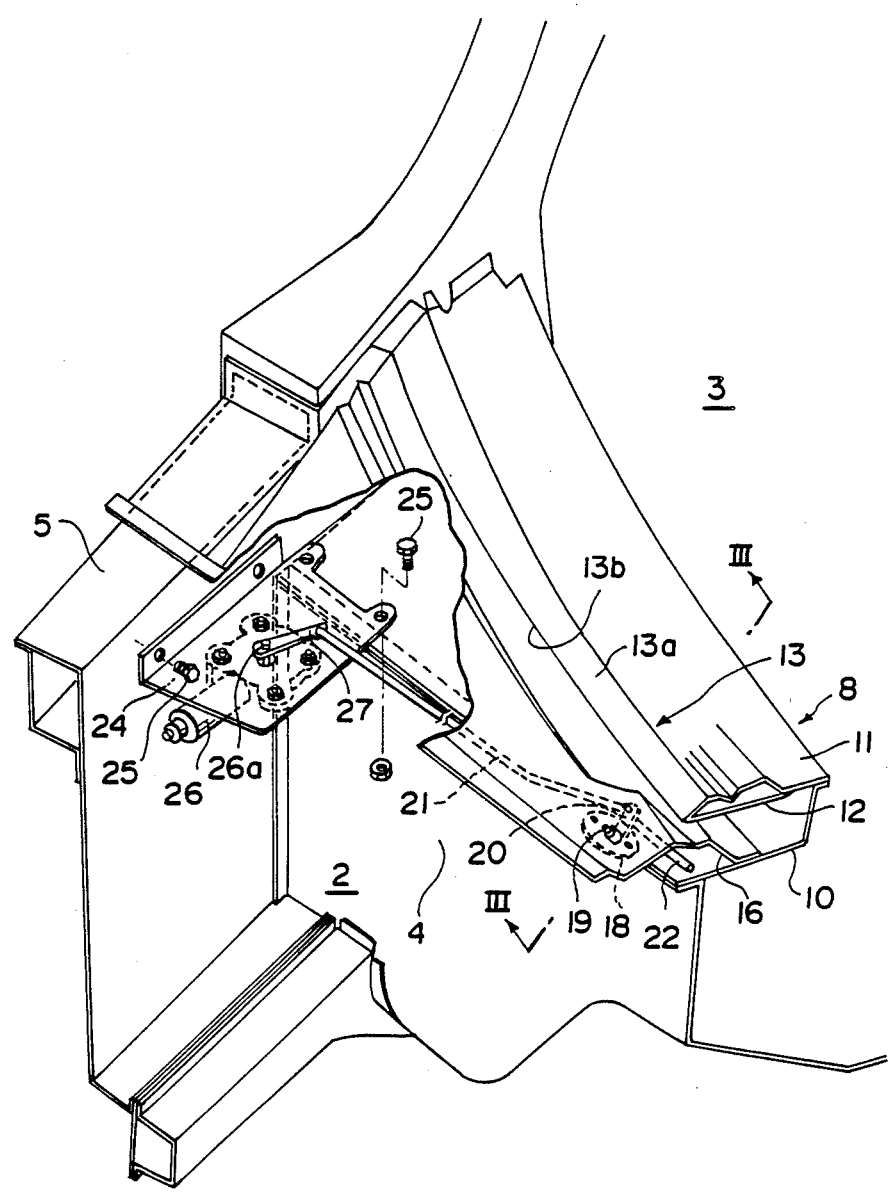
FIG. 2 is a cutaway enlarged fragmentary perspective view showing a part of the front part of the vehicle body.
Figure 3:
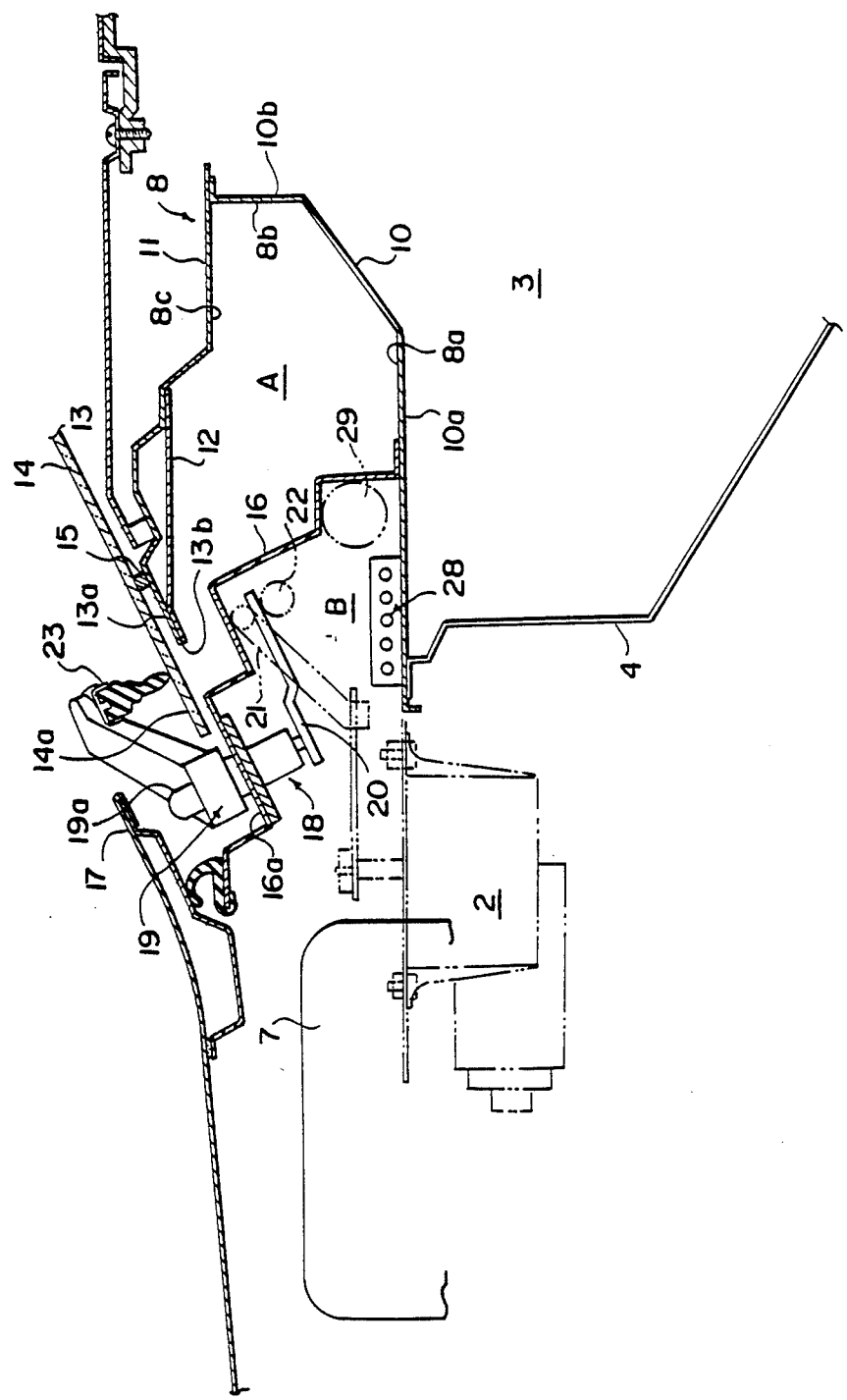
FIG. 3 is a cross-sectional view taken along line III—III in FIG. 2.

In FIG. 1, a vehicle body 1 has an engine room 2 and a passenger room 3 to the rear of the engine room 2. The engine room 2 and the passenger room 3 are separated by a dashboard lower panel 4. Left and right sides of the engine room 2 are defined by wheel apron lanes 5. As shown in FIG. 1, an engine body 6, a surge tank 7 and the like are disposed in the engine room 2. A cowl portion 8 is formed above the dashboard lower panel 4 as shown in FIGS. 2 and 3. The cowl portion 8 has an opening 9 which opens upward at the front side of the cowl portion 8. The cowl portion 8 is defined by a dashboard upper panel 10, a cowl panel 11 and a support member 12. The dashboard upper panel 10 is substantially L-shaped in cross-section and is connected to the upper end of the dashboard lower panel 4. The dashboard upper panel 10 comprises a bottom wall portion 10a which extends rearward from the upper end of the dashboard lower panel 4 and defines a bottom 8a of the cowl portion 8, and a rear wall portion 10b which extends upward from the rear end of the bottom wall portion 10a and defines rear side 8b of the cowl portion 8. The cowl panel 11 is connected to the upper end of the rear wall portion 10b of the dashboard upper panel 10 and extends forward therefrom. The support member 12 is connected to the cowl panel 11 in such a way that it joins an intermediate portion (as viewed in the longitudinal direction of the vehicle body) of the cowl panel 11 and the front end portion of the same and defines a closed cross-section as shown in FIG. 3. The cowl panel 11 and the support member 12 define a top side 8c.

As shown in FIG. 3, the cowl panel 11 and the support member 12 define a windshield supporting portion 13 at the front end portion thereof. The windshield supporting portion 13 is reinforced with said closed-cross section portion defined by the cowl panel 11 and the support member 12. The windshield supporting portion 13 includes a windshield supporting surface 13a which is inclined at the mounting angle of a windshield 14.

The windshield 14 is bonded to the windshield supporting surface 13a with sealing material 15. In this particular embodiment, the windshield 14 is made of laminated safety glass, and the sealing material 15 may be of a known type. Though not shown, the windshield 14 is also bonded to the vehicle body at upper portions thereof.

The windshield 14 is bonded to the windshield supporting portion 13 at an intermediate portion as viewed in the longitudinal direction of the vehicle body, and the front end portion or the lower end portion 14a of the windshield 14 extends beyond the front edge 13b of the windshield supporting portion 13 and above the opening 9 of the cowl portion 8. That is, when compared with the windshield in a conventional windshield supporting structure combined with an open cowl box, the windshield 14 extendeds more forward and downward by the length of the portion extending beyond the windshield supporting portion 13. The portion extending beyond the windshield supporting portion 13 will be referred to as "the forward extension portion", hereinbelow.

Figure 4:
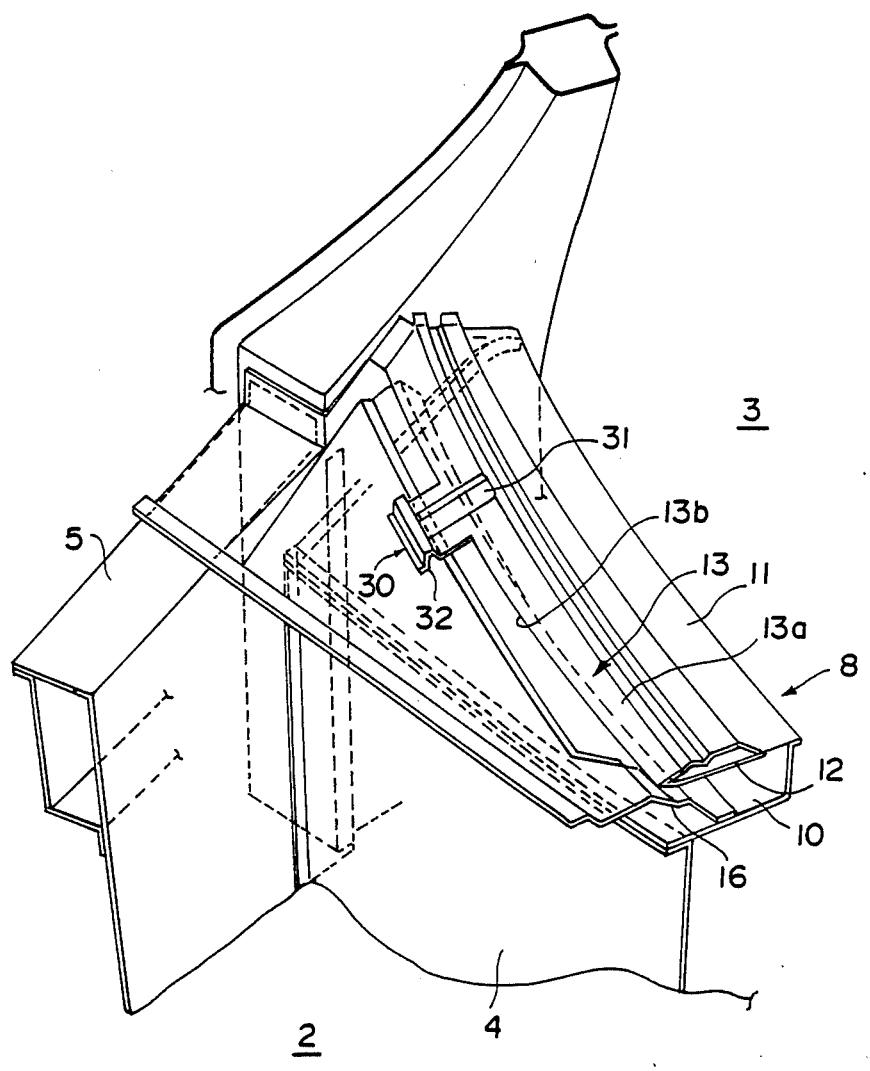
FIG. 4 is a fragmentary perspective view showing a locator member.

As shown in FIGS. 2 to 4, a partition member 16 is disposed in the cowl portion 8. As clearly shown in FIG. 3, the partition member 16 extends from the front and upper side of the opening 9 of the cowl portion 8 toward the inside of the cowl portion 8. The front end of the partition member 16 is provided with a seal member which is adapted to abut against the inner surface of an engine hood 17. The rear end of the partition member 16 is fixed to the bottom wall portion 10a of the dashboard upper panel 10 by spot welding or the like. The partition member 16 extends away from the surge tank 7 and divides the inner space of the cowl portion 8 into two chambers A and B. Further, as clearly shown in FIG. 3, the partition member 16 is bent stepwise, whereby the bending strength of the partition member 16 is weakened.

A wiper system 18 is mounted on the partition member 16. The wiper system 18 has a pair of pivot shafts 19 (only one of which is shown) which are mounted for rotation on the uppermost step 16a of the partition member 16. The pivot shafts 19 project into the chamber B and an arm 20 is integrally connected to the lower end portion of each pivot shaft 19. A connecting link 22 connects the free end portions of the arms 20, and a driving rod 21 is connected to the free end portion of one of the arms 20 at one end as shown in FIGS. 2 and 3.

In order to fully conceal the wiper system, the pivot shafts 19 are disposed so that their upper end portions 19a are positioned in the vicinity of the lower end of the forward extension portion 14a of the windshield 14, and wiper blades 23 are positioned on the forward extension portion 14a when they are at rest.

As shown in FIG. 2, the driving rod 21 extends transversely in the chamber B, and the other end (the end remote from the arm 20) of the driving rod 21 reaches into the vicinity of one of the wheel apron lanes 5. A bracket 24 is fixed to each of the wheel apron lanes 5 and the dashboard upper panel 10 like a brace by bolts 25 in order to reinforce this part. An electric motor 26 is fixedly mounted on the lower surface of one of the brackets 24, and said the other end of the driving rod 21 is connected to the output shaft 26a of the motor 26 by way of an arm 27.

Further, as shown in FIG. 3, harnesses 28 and 29, and the like are disposed in the chamber B.

A pair of locator members 30 is provided on the windshield supporting portion 13 as shown in FIG. 4 though only one locator member 30 is shown in FIG. 4. The locator member 30 extends forward and downward from the front edge of the windshield supporting portion 13 and is inclined at the same angle as the windshield supporting surface 13a. The locator member 30 is provided with a guide groove 31 and a stopper portion 32. The guide groove 31 extends in the longitudinal direction of the locator member 30. The stopper portion 32 projects upward beyond the upper edge of the guide groove 31 at the front end of the guide groove 31 and is fixed to the partition member 16 by spot welding or the like.

Figure 6:
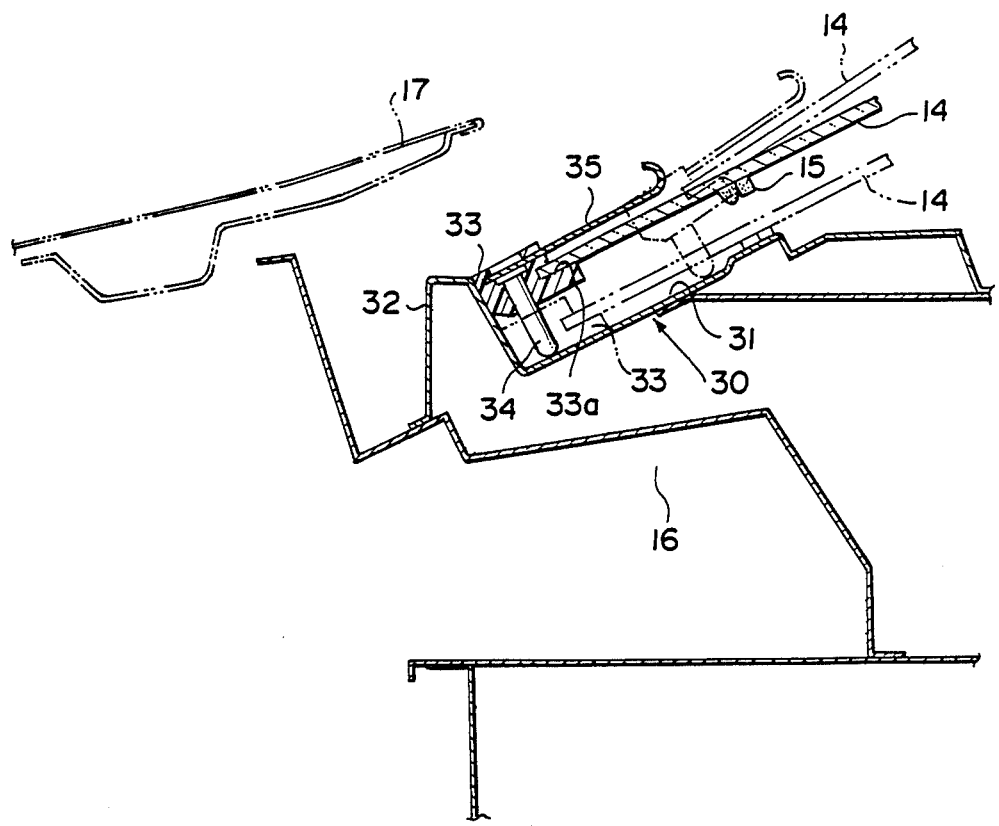
FIG. 6 is a cross-sectional view for illustrating how to locate the windshield.

When the windshield 14 is mounted, a pair of guide members 33 are transversely spaced from each other and attached to the lower edge of the windshield 14 a shown in FIGS. 5 and 6. Each guide member 33 has a groove 33a, and the guide member 33 is pushed against the lower edge of the windshield 14 so that the lower edge of the windshield 14 is forced into the groove 33a when the guide member 33 is attached to the windshield 14. As can be understood from FIG. 6, a guide pin 34 is held on the guide member 33 by a stopper plate 35 in such a manner that the guide pin 34 is released from the guide member 33 when the stopper plate 35 is drawn.

The windshield 14 is moved downward while the guide pin 34 is kept engaged with the guide groove 31 of the locator member 30. During the downward movement of the windshield 14, the sealing material 15 on the windshield 14 is kept away from the windshield supporting portion 13 so that the adhesive layer of the sealing material 15 is not brought into contact with the windshield supporting portion 13 and the windshield 14 is positioned in the transverse direction of the vehicle body by virtue of the engagement of the guide pin 34 with the guide groove 31.

The lower end of the windshield 14 is positioned through abutment of the front end face of the guide member 33 against the stopper portion 32.

When the stopper plate 35 is subsequently drawn out from the guide member 33, the windshield 14 moves toward the windshield supporting surface 13a under the force of gravity while being guided by the guide pin 34 and the stopper portion 32, and the sealing material 15 is brought into contact with a predetermined portion of the windshield supporting surface 13a.

Thereafter, the upper end portion of the windshield 14 is brought into abutment against a front header 1a as shown in FIG. 5. Thus, the windshield 14 is mounted in place on the vehicle body 1.

Instead of the locator member 30 having the guide groove 31, the stopper portion 32 may be provided with a locator hole 36 which is adapted to be engaged with the guide member 33 as shown in FIG. 7.

When the vehicle has a head-on collision, the surge tank 7 is displaced rearward and impacts against the pivot shafts 19 as shown by the chained line in FIG. 8, which thereby displaces rearward the pivot shafts 19. When the pivot shafts 19 are displaced rearward, the upper end portions of the pivot shafts 19 impact against the forward extension portion 14a of the windshield 14. Accordingly, a counterclockwise (as seen in FIG. 8) bending moment about the sealing material 15 acts on the windshield 14, and the forward extension portion 14a is pivoted about the sealing material 15 within the elastic deformation range of the windshield 14 until it abuts against the front end 13b of the windshield supporting portion 13 as shown by the chained line in FIG. 8. This causes stress to concentrate on the portion of the windshield 14 at which it abuts against the windshield supporting portion 13, and thereafter, a bending moment no longer acts on the windshield 14. In this embodiment, debonding of the windshield 14 upon a head-on collision can be thus prevented.

Further, in the embodiment described above, the forward extension portion 14a can be easily positioned with the locator members 30 irrespective of the fact that the vehicle is provided with an open cowl.

Further, since the locator members 30 extend along only a part of the windshield supporting portion 13 and the stopper portions 32 on the front end thereof are fixed to the partition member 16 by spot welding, the locator members 30 hardly function as a reinforcement for the partition member 16. Accordingly, the locator members 30 do not prevent rearward movement of the pivot shafts 19 upon a head-on collision and the forward extension portion 14a of the windshield 14 is surely bent so that the windshield 14 is not debonded from the windshield supporting portion 13. The fact that the partition member 16 is bent at a plurality of portions in order to weaken it as described above also facilitates the rearward movement of the pivot shafts 19.

Further, since the cowl portion 8 is not provided with a cowl front panel, which is unlike the conventional vehicle body provided with an open cowl portion, and the wiper system 18 is mounted on the partition member 16 which is positioned toward the rear in the space into which the surge tank 7 is expected to be forced upon head-on collision, the partition member 16 and the wiper system 18 can be disposed at a larger distance from the surge tank 7 and the area of the partition member 16 and the wiper system 18 against which the surge tank 7 can impact. Accordingly, the load which acts on the wiper system 18 or the like upon head-on collision can be reduced.

Since the components of the wiper system 18 are disposed in the chamber B which opens into the engine room 2, the wiper system 18 can be easily incorporated in the vehicle body from the engine room side.

Figure 9:
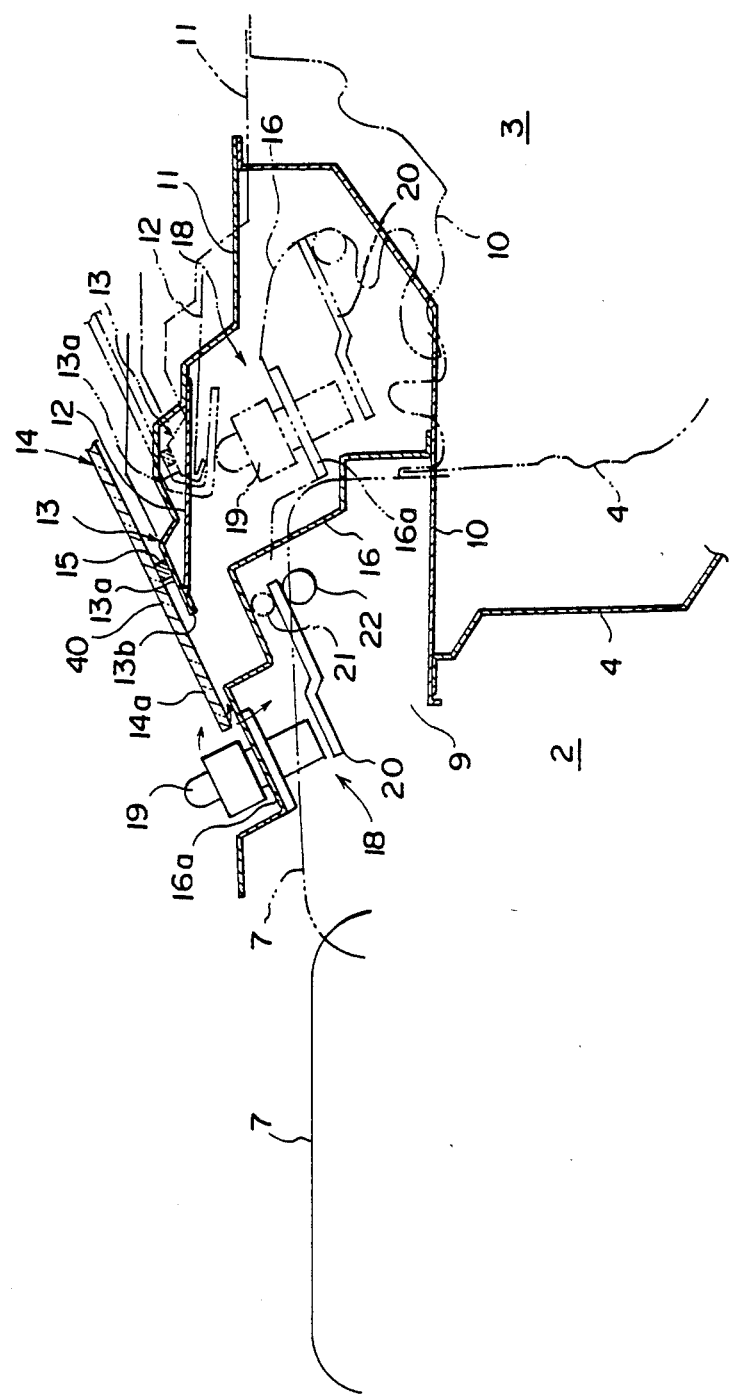
FIG. 9 is a view similar to FIG. 8 but showing the behavior, upon head-on collision, of the parts of a front part of a vehicle body provided with a windshield supporting structure in accordance with another embodiment of the present invention.

The windshield 14 may be provided with a notch 40 at the forward extension portion 14a between the sealing material 15 and the lower end thereof as shown in FIG. 9 in order to further ensure that the forward extension portion 14a is bent before the windshield 14 is debonded from the windshield supporting portion 13.

Further, the thickness of the windshield 14 may be reduced at the forward extension portion 14a as shown in FIG. 10 for the same purpose. As can be understood from FIG. 10, the forward extension portion 14a in this embodiment has a single ply while the other part of the windshield 14 has a plurality of plies.

Further, the windshield supporting portion 13 may be provided with a projection 41 which projects toward the forward extension portion 14a between the sealing material 15 and the front edge 13b of the windshield supporting portion 13 as shown in FIG. 11 for the same purpose.

The last embodiment is advantageous in that its workability is superior to that in the second and third embodiments since the windshield 14 need not be processed.

We claim:

1. A windshield supporting structure, which is to be employed in combination with an open cowl structure having an opening which opens upward, includes a windshield supporting portion which is provided at the rear end portion of the opening to which the windshield is bonded, and is characterized in that said windshield supporting portion is positioned so that it supports the windshield at an intermediate portion thereof as viewed in the longitudinal direction of the vehicle body and so that the windshield extends forward and downward beyond the windshield supporting portion, said windshield supporting structure comprising a deformation control means which makes the part of the windshield extending forward and downward beyond the windshield supporting portion more bendable than the other part of the windshield.

2. A windshield supporting structure as defined in claim 1 in which said deformation control means is provided on a part of the vehicle body opposed to the part of the windshield extending forward and downward beyond the windshield supporting portion.

3. A windshield supporting structure as defined in claim 2 in which said deformation control means comprises a projection which is fixed to the windshield supporting portion and projects toward a portion of the windshield in front of the portion at which the windshield is bonded to the windshield supporting portion.

4. A windshield supporting structure as defined in claim 1 in which said deformation control means is provided on the windshield.

5. A windshield supporting structure as defined in claim 4 in which said deformation control means comprises a notch which is formed on the windshield at a portion in front of the portion at which the windshield is bonded to the windshield supporting portion, and extends in the transverse direction of the vehicle body.

6. A windshield supporting structure as defined in claim 4 in which the thickness of the part of the windshield extending forward and downward beyond the windshield supporting portion is smaller than that of the other part of the windshield.

7. A windshield supporting structure as defined in claim 6 in which said windshield is made of laminated glass and the part of the windshield extending forward and downward beyond the windshield supporting portion has a single ply.

8. A windshield supporting structure as defined in claim 1 in which the inner space of said open cowl structure is divided into two chambers by a partition member.

9. A windshield supporting structure as defined in claim 8 in which said partition member is bent stepwise.

10. A windshield supporting structure as defined in claim 8 in which a wiper system is mounted on the partition member.

11. A windshield supporting structure as defined in claim 1 in which said windshield supporting portion is provided with a locator means with which the windshield is positioned when the windshield is mounted on the vehicle body.

12. A windshield supporting structure as defined in claim 11 in which said locator means is connected to a partition member which divides the inner space of the cowl structure into two chambers.

13. A windshield supporting structure as defined in claim 11 on which said locator means comprises a guide groove which extends in the longitudinal direction thereof so that the windshield can be guided by the guide groove.

14. A windshield supporting structure as defined in claim 11 in which said locator means comprises a locator hole which is provided on a stopper portion, which is provided on the locator means to support the windshield, so that the windshield can be engaged into the locator hole.

15. A windshield supporting structure, which is to be employed in combination with an open cowl structure having an opening which opens upward, includes a windshield supporting portion which is provided at the rear end portion of the opening and to which the windshield is bonded, and is characterized in that said windshield supporting portion is positioned so that it supports the windshield at an intermediate portion thereof as viewed in the longitudinal direction of the vehicle body and so that the windshield extends forward and downward beyond the windshield supporting portion, said windshield supporting portion is provided with a locator means with which the windshield is positioned when the windshield is mounted on the vehicle body, and said locator means is connected to a partition member which divides an inner space of the cowl structure into two chambers.

16. A windshield supporting structure, which is to be employed in combination with an open cowl structure having an opening which opens upward at the front side of the cowl structure, includes a windshield supporting portion which is provided at the rear end portion of the opening to define a top side of the cowl structure and to which the windshield is bonded, and is characterized in that said windshield supporting portion is positioned so that it supports the windshield at an intermediate portion thereof as viewed in the longitudinal direction of the vehicle body and so that the windshield extends forward and downward beyond the windshield supporting portion.

17. A windshield supporting structure as defined in claim 16 in which the inner space of said open cowl structure is divided into two chambers by a partition member.

18. A windshield supporting structure as defined in claim 17 in which said partition member is bent stepwise.

19. A windshield supporting structure as defined in claim 17 in which a wiper system is mounted on the partition member.

* * * * *